Patented Dec. 1, 1925.

1,564,050

UNITED STATES PATENT OFFICE.

JOHN B. DICKSON, OF AKRON, OHIO, ASSIGNOR TO THE B. F. GOODRICH COMPANY, OF NEW YORK, N. Y., A CORPORATION OF NEW YORK.

METHOD OF TREATING RUBBER COMPOSITION.

No Drawing. Application filed January 31, 1923. Serial No. 616,183.

*To all whom it may concern:*

Be it known that I, JOHN B. DICKSON, a citizen of the United States, residing at Akron, in the county of Summit and State of Ohio, have invented a certain new and useful Method of Treating Rubber Composition, of which the following is a specification.

This invention relates to methods of treating and controlling the behavior of rubber compositions, and is of especial value in preventing the adhesion of rubber compounds to the molds in which they are vulcanized.

My chief object is to provide an improved method of preventing adhesion of a rubber compound, and especially the adhesion of a mass of rubber to the surface of the mold in which it is vulcanized. A further object is to provide vulcanized rubber articles which will be smooth surfaced and free from surface films or particles of foreign matter such as heretofore have resulted from materials used to prevent adhesion of the rubber to the mold. Another object is to provide a method of preventing the adhesion of masses of unvulcanized rubber in the handling of such masses prior to their use in the manufacture of rubber goods.

My invention, briefly stated, comprises vulcanizing a surface film of a rubber mass more thoroughly than or in advance of the vulcanization of the main body of the mass, and I accomplish this by applying, to the surface of a rubber mass containing a vulcanizing agent, such small quantity of an active accelerator of vulcanization as to effect relatively thorough vulcanization of a surface film upon the rubber mass without substantial penetration or accelerating effect with respect to the body of rubber beyond said surface film.

Where the purpose is to prevent sticking of an article to the mold in which it is vulcanized, and the unvulcanized article has substantially the form of the molding cavity, the accelerator may be applied to the article before the latter is placed in the mold, this being more economical in many instances than to apply the accelerator to the surface of the mold, since the article as a rule is lighter and easier handled than the mold, and of such configuration as to make the application to the article the more convenient. Where the rubber mass prior to vulcanization is of such configuration as to require substantial deformation in the molding thereof, I prefer to apply the accelerator, in solution, to the molding surface of the mold, to avoid excessive mixing of the accelerator with the rubber.

During the molding and vulcanizing operation the thin film of accelerator, applied as described either to the article or to the mold, apparently effects a more rapid and thorough vulcanization of the surface film of rubber than would occur in the absence of the accelerator, with the result that adhesion of the rubber to the mold is substantially avoided by the use of the accelerator, even where no other means of preventing adhesion is employed. By careful regulation of the amount and character of the accelerator used, the more advanced, adhesion-preventing, surface vulcanization may be limited to an extremely thin film at the surface of the rubber, so that the general characteristics of the vulcanized article are substantially the same as are produced by the use of substances heretofore employed to prevent adhesion, while the surface itself is smooth and free from foreign matter, the accelerator becoming incorporated in the surface of the rubber. I find that 3 to 5% alcohol solution of tributylamine, for example, sparingly applied to the article or to the mold, is suitable to produce the desired result.

While some accelerators, such as aldehyde ammonia and quinoidine, when used as above described, on light colored compounds, result in more or less discoloration of the rubber article, even though absorbed therein, I have found that many of the active accelerators may be used even in white compounds without substantial discoloration.

By way of example, in practicing the invention to produce a white article without substantial discoloration, I have used a 1% alcohol solution of benzylamine as the surface accelerator with a rubber compound consisting of 50 parts of rubber, 20 parts of whiting, 40 parts of zinc oxide, 2 parts of sulfur and 0.8 parts of thiocarbanalide. Discoloration obviously will depend upon the accelerator and compound used, and those which result in discoloration and those which do not will be known to, or may readily be determined by, those skilled in the art.

In preventing the adhesion of rubber masses during their handling prior to the molding thereof, I preferably apply the accelerator in solution to the surface of the rubber mass by means of a brush or by spraying it, in solution, upon the surface of the mass, and I preferably use a low temperature accelerator so that little or no heating of the mass is necessary to render it non-adhesive.

Low temperature accelerators may be similarly applied to articles formed of unvulcanized rubber or to moldable blanks to prevent adhesion during the handling of such articles or blanks prior to their general vulcanization. I find that a 5% solution of dithio-dibenzoyl-disulfide in carbon tetrachloride provides a suitable quantity of the accelerator to produce the desired surface vulcanization without unduly affecting the condition of the main body of the mass.

Other accelerators suitable for use under my invention, both as to the low temperature accelerators for use prior to general vulcanization and also low or high temperature accelerators suitable for use to prevent mold adhesion, will be known to those skilled in the art, and the particular accelerators most suitable for each situation may readily be determined. As to mold adhesion, I have found that substantially all of the active accelerators may be used with good results, although in general I find that the more quickly crystallizing accelerators are less effective than the amorphous or more slowly crystallizing accelerators, the latter being adapted to provide a more continuous film prior to their absorption in the rubber.

It will be understood that my invention is not wholly limited to the specific substances nor to the exact procedure above described, but is subject to modifications within the scope of the appended claims.

I claim:

1. The method of treating a mass of rubber composition containing a vulcanizing agent which comprises applying to the surface thereof such small quantity of a vulcanization accelerator as to be effective upon the surface portion only of said mass and thereby effecting a relatively high degree of vulcanization at the surface of the mass.

2. The method of preventing mold adhesion of a mass of rubber composition containing vulcanizing agents, in proportions to secure a desired cure of the mass which comprises subjecting the mass to an added, light surface application of a vulcanization accelerator in the molding thereof.

3. The method of vulcanizing a mass of a vulcanizable rubber compound having incorporated therein an accelerator of vulcanization which comprises applying a light coating of a weak solution of relatively low temperature accelerator of vulcanization to the surface of the mass, and effecting a vulcanization of a surface film in advance of the vulcanization of the mass.

4. The method of reducing tackiness of the surface of a mass of vulcanizable rubber compound containing an accelerator of vulcanization which comprises applying to the surface of the mass a vulcanization accelerator capable of initiating vulcanization at a lower temperature than the accelerator of vulcanization contained in the vulcanizable rubber mass in such small quantities as to be effective upon the surface portion only of the mass.

5. The method of preventing adhesion to a mold during vulcanization of a mass of vulcanizable rubber composition which comprises subjecting the mass to a light surface application of a solution of vulcanization accelerator prior to vulcanization.

In witness whereof I have hereunto set my hand this 29 day of January, 1923.

JOHN B. DICKSON.